UNITED STATES PATENT OFFICE.

EMIL FISCHER, OF BERLIN, GERMANY, ASSIGNOR TO C. F. BOEHRINGER & SOEHNE, OF WALDHOF, GERMANY.

XANTHIN DERIVATIVES AND PROCESS OF MAKING SAME.

SPECIFICATION forming part of Letters Patent No. 631,707, dated August 22, 1899.

Application filed January 31, 1898. Serial No. 668,645. (Specimens.)

*To all whom it may concern:*

Be it known that I, EMIL FISCHER, a citizen of the Empire of Germany, residing at Berlin, in the Empire of Germany, have invented certain new and useful Improvements in the Manufacture of Oxy-Purins and their Derivatives; and I do hereby declare the following to be a full, clear, and exact description of the invention, such as will enable others skilled in the art to which it appertains to make and use the same.

The present invention relates to the preparation of oxy-purins and their alkyl derivatives, and particularly the production of a series of bodies starting from trichloropurin, a compound which is described in Letters Patent of the United States No. 598,502, dated February 8, 1898.

My present invention has for its specific object the manufacture of chloro-caffein as a derivative of the new compound chloroxanthin, which in turn I have found to be a derivative of trichloropurin.

Before proceeding with the description it should be stated that the nomenclature herein followed is that adopted by the article published in *Berichte der Deutschen Chemischen Gessellschaft*, Vol. 30, page 549. According to this nomenclature a large number of bodies—such as caffein, uric acid, guanin, adenin, &c.—are designated by the generic term "purins," and their nucleus, the "purin group," has its several carbon and nitrogen atoms numbered in the following manner:

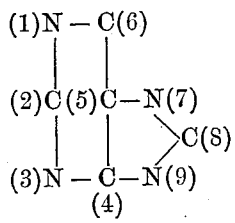

Bearing this nomenclature and system of numbering the position of the atoms in mind, the use of terms in the following description will be readily understood. Thus, for example, the chloro-caffein which I obtain as the result of my invention will under this new nomenclature be equivalent to 1-3-7-trimethyl-8-chloro-2-6-dioxy-purin, while the new compound, chloroxanthin, may thereunder be styled 8-chloro-2-6-dioxypurin.

In an application, Serial No. 668,644, filed concurrently herewith I have described a process of preparing a xanthin by treating trichloro purin with an alkali and then submitting the resulting chloro-oxypurin (under which designation are included 2-8-dichloalkyl-oxypurins, 2-8-dichloro-oxypurin, 8-chloro-dialkyl-oxy-purins, and 8-chloro-dioxypurin) to a reducing agent, before or after alkylization. That application, however, is intended to cover such invention generically, while the specific subject-matter of said application is the production of alkylized hypoxanthins and the intermediate compound 1-7-dimethyl-6-oxy-2-8-dichloro-purin and its method of preparation.

The subject-matter of the present invention is specifically the preparation of chloroxanthin and its derivative, chloro-caffein. It also involves the new product, chloro-xanthin, and such further features as will be hereinafter set forth, and pointed out in the claims.

In carrying out my invention according to said application, Serial No. 668,644, I cause trichloropurin to be acted upon with alcoholic alkali at a higher temperature. Two chlorin atoms are thereby eliminated—namely, that occupying the position 2 and that in position 6. As a result of this reaction we obtain 8-chloro-2-6-diethoxy-purin, having the structural formula:

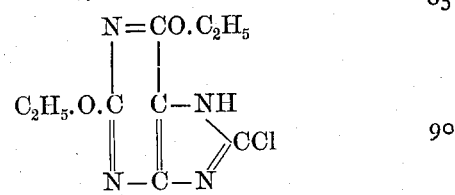

and which constitutes the starting-point of this application. The latter body on treatment with hydrochloric acid loses the two ethyl groups, forming 2-6-dioxy-8-chloropurin, having the structural formula:

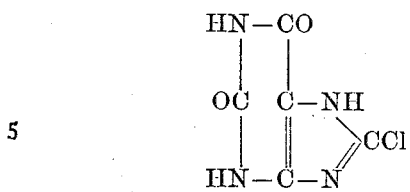

This latter body, which on account of its structure I term "chloro-xanthin," may by reduction be converted into 2-6-dioxy-purin:

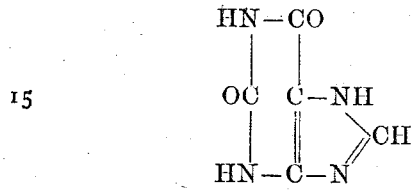

which is identical with natural xanthin.

In order to enable those versed in the art to carry out the invention, I will now give a detailed description of the same. The proportions given are all understood to be by weight.

In proceeding toward the manufacture of the chloro-xanthin my synthesis proceeds over the new intermediate compound, 8-chloro-2-6-diethoxy-purin, which, together with its method of preparation, forms the subject-matter of another application, No. 668,646, filed concurrently with this. They are not herein claimed, therefore, but are described and disclosed herein for the purpose of a complete explanation of the present invention. This 8-chloro-2-6-diethoxy-purin may be obtained in two ways, generically the same, but differing specifically. These two methods are, first, the conversion of 2-6-8-trichloro-purin into 2-8-dichloro-6-ethoxy-purin and of the latter into 8-chloro-2-6-diethoxy-purin; second, the direct conversion of the trichloropurin into 8-chloro-2-6-diethoxy-purin.

*1. Preparation of 2-8-dichloro-6-ethoxy-purin and its conversion into 8-chloro-2-6-diethoxy-purin.*—Four parts dry trichloropurin, whose properties and mode of preparation are set forth in my aforesaid patent, No. 598,502, dissolved in sixteen parts of alcohol and this solution after being rapidly cooled to about 10° to 15° centigrade and which as a rule has a tendency to throw out crystals of the trichloropurin is added to a solution of one and two-tenths parts of sodium in twenty-four parts of alcohol, cooled to room temperature. A clear pale-yellow liquid results, whose temperature rises spontaneously to about 30° centigrade and soon becomes turbid by reason of a precipitation of sodium chlorid. The mixture is allowed to stand at ordinary temperature for three hours, whereupon fifty parts of water are added and the whole is supersaturated slightly with acetic acid. The alcohol is then evaporated off, whereby the dichloro-ethoxy-purin is precipitated in colorless very flexible acicular crystals. The same is then purified by recrystallization from hot benzene. Its formula is $C_7H_6Cl_2N_4O$ or

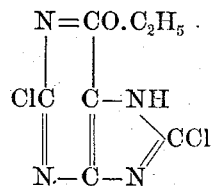

It softens at about 190° centigrade and melts completely at about 200° centigrade, the fusion being accompanied by decomposition. It is soluble only with difficulty in hot water, but dissolves readily in hot alcohol and acetone.

The above converting process proceeds according to the equation:

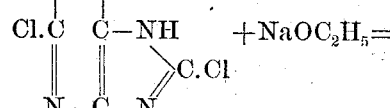

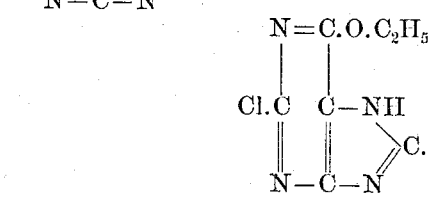

*Conversion of 2-8-dichloro-6-ethoxy-purin into 8-chloro-2-6-diethoxy-purin.*—I heat 2-8-dichloro-6-ethoxy-purin together with a concentrated alcoholic solution of sodium-ethylate in a closed vessel to 100° centigrade, maintaining this temperature for three hours. The sodium-ethylate must be in excess or at least one molecule more than sufficient to neutralize the dichloro-ethoxy-purin. The alcohol is then evaporated and the residue dissolved in water, the resulting yellow solution being then supersaturated with acetic acid, whereby the diethoxy-chloropurin is obtained as a copious precipitate, which forms fine needles.

*2. Direct conversion of trichloropurin into 8-chloro-2-6-diethoxy-purin.*—I heat trichloropurin (one part) together with a concentrated alcoholic solution of sodium-ethylate (containing one part of sodium) in a closed vessel to 100° centigrade, maintaining this temperature for three hours. The sodium-ethylate must be in excess or at least two molecules more than sufficient to neutralize the trichloropurin. The alcohol is then evaporated and the residue is dissolved in water, the resulting yellow solution being then supersaturated with acetic acid, whereby the diethoxy-chloropurin is obtained as a copious precipitate, which forms fine needles. This new body as formed under the two methods above given has the formula $C_9H_{11}N_4ClO_2$, or, structurally expressed,

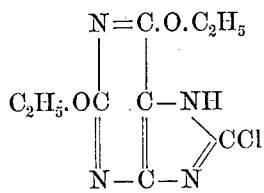

The reaction takes place according to the equation:

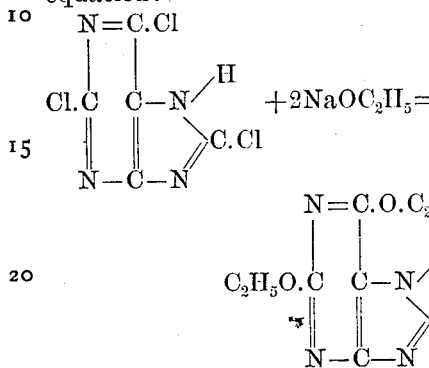

It is very similar in behavior to the monoethoxy compound described under example 1. Like the latter, it softens at about 190° and melts at about 205° centigrade, the melting-point being not sharply defined and fusion being attended by decomposition and evolution of gas. In hot alcohol it is very readily soluble, but very difficult of solution in benzene. It is readily soluble in alkalies, including ammonia and baryta water. Boiling water dissolves the same only with difficulty, one thousand parts of the same being required for the solution of one part of the compound.

*3. Conversion of 8-chloro-2-6-diethoxy-purin into chloro-xanthin.*—If the chlorodiethoxypurin is submitted to the influence of hydrochloric acid, the chlorin atom remains in the molecule, while the ethyl groups are split off, as under the ninth head. If one part of the powdered chlorodiethoxypurin is heated on the water-bath with five times its weight of hydrochloric acid of the specific gravity 1.19, it first goes into complete solution, and a short time thereafter the 8-chloro-2-6-dioxypurin or chloro-xanthin, which is soluble only with great difficulty, begins to be precipitated. The decomposition is completed at the end of about half an hour. The reaction takes place according to the equation:

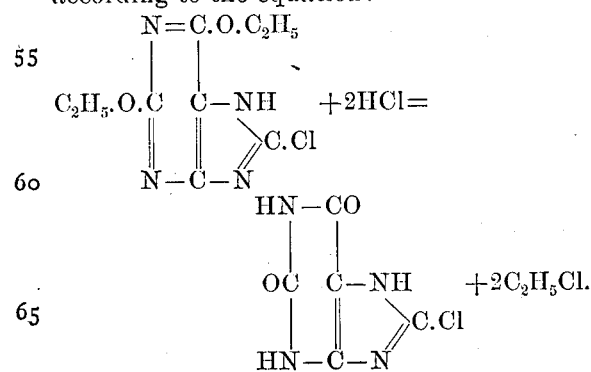

To completely purify, the chloro-xanthin is converted into the readily-crystallizing ammonium salt by dissolving in warm very dilute aqueous ammonia. On slowly cooling the ammonium salt is obtained in the form of small, but well-developed, apparently rectangular tablets. The said ammonium salt is then again decomposed by acid, such as hydrochloric acid, as will be readily understood. 8-chloro-xanthin has the composition $C_5H_3ClN_4O_2$ and the molecular structure:

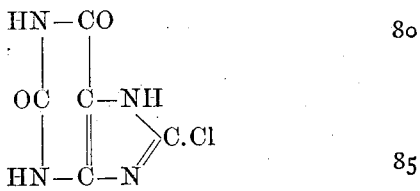

It dissolves with difficulty in hot water and alcohol and glacial acetic acid. From the warm solution of its salts it is precipitated by mineral acids as a colorless granular crystalline mass. On heating it chars without melting. It dissolves readily in concentrated sulfuric acid, being precipitated from such solution by the addition of water. Its alkali salts are readily soluble in water. Its potassium salt crystallizes from strong potash lye in the form of very fine pliable needles. Its ammonium salt is much less soluble. On slowly cooling of an aqueous solution of the same it crystallizes in small, but well-developed, apparently rectangular tablets.

Chloro-xanthin is readily converted into xanthin by reduction with hydrogen-iodid. Like xanthin, it gives a very strong murexid test.

*4. Conversion of chloro-xanthin into chloro-caffein.*—This conversion is effected by the aid of an alkylizing agent. For this purpose two parts of chloro-xanthin are dissolved in so much normal potash lye that the amount of caustic potash corresponds to three molecules. The solution is then shaken for two hours, together with five parts of methyl-iodid, in a closed vessel at a temperature of 80° centigrade. During this operation the largest portion of the chloro-caffein, which is 1-3-7-trimethyl-2-6-dioxy-8-chloropurin, is separated in the form of fine needles. These are put upon the filter after cooling and washed with very dilute soda-lye, which acts to remove the traces of an acid compound mixed with the crystals. The latter are then recrystallized from hot water or hot alcohol. The product is identical with chloro-caffein, which has been formed by chlorinizing natural caffein and which may be converted into the latter by known methods, (reducing agencies.)

What I claim, and desire to secure by Letters Patent of the United States, is—

1. The process which consists in treating a 8-chloro-2-6-dialkyl-oxy-purin with hydrogen-chlorid.

2. The process which consists in heating 8-chloro-2-6-diethoxy-purin with hydrochloric acid.

3. The process which consists in heating 8-chloro-2-6-diethoxy-purin together with hydrochloric acid in the water-bath, and then converting the precipitate into its ammonium salt and decomposing the latter by a suitable acid, whereby the chloro-xanthin is obtained in a pure condition.

4. As a new chemical compound, chloro-xanthin, or 8-chloro-2-6-dioxy-purin, having the formula above given, which is soluble in sulfuric acid but precipitated from such solution by water, soluble with difficulty in hot water, alcohol and acetic acid, which forms alkali salts readily soluble in water and an ammonium salt crystallizing in small, apparently rectangular tablets, which chars without melting on being heated which is precipitated from warm solutions of its salts by mineral acids in the form of a colorless granular crystalline mass and which gives a very strong murexid test.

5. In the art of preparing chloro-purins the step which consists in subjecting chloro-xanthin to the action of an alkylizing agent.

6. The process which consists in subjecting chloro-xanthin to the action of a methylating agent.

7. The process which consists in dissolving chloro-xanthin in an alkaline liquid and then acting on the same with a haloid ether.

8. The process which consists in dissolving chloro-xanthin in a potash lye and then heating the same together with methyl-iodid in a closed vessel.

9. The process which comprises the following steps of dissolving chloro-xanthin in a solution of normal potash lye, then shaking the solution together with methyl-iodid in a closed vessel at a temperature of 80°, centigrade, for two hours, then, after cooling, washing the resultant crystals on the filter with dilute soda-lye.

10. The process which consists in treating 8-chloro-2-6-diethoxy-purin with hydrochloric acid and then treating the resultant body with an alkylizing agent.

11. The process which consists in heating 8-chloro-2-6-diethoxy-purin with hydrochloric acid, purifying the resultant chloro-xanthin and then dissolving the same in an alkaline liquid and treating the same with methyl-iodid.

In testimony whereof I affix my signature in presence of two witnesses.

EMIL FISCHER.

Witnesses:
CHAS. H. DAY,
HENRY HASPER.